United States Patent Office 3,554,731
Patented Jan. 12, 1971

3,554,731
METHOD FOR MANUFACTURING AMMONIUM NITRATE CONTAINING MIXED FERTILIZERS
George H. Madany, Minneapolis, Minn., and George Burnet, Jr., Ames, Iowa, assignors to Iowa State University Research Foundation, Inc., Ames, Iowa, a corporation of Iowa
No Drawing. Filed Sept. 11, 1967, Ser. No. 666,977
Int. Cl. C05c 1/02
U.S. Cl. 71—59                    10 Claims

ABSTRACT OF THE DISCLOSURE

Mixed fertilizers containing ammonium nitrate are stabilized by incorporating a small percentage of a bromide or iodide salt, which inhibits the decomposition of the ammonium nitrate. Ammonium, alkali metal, or alkaline earth metal iodides or bromides can be used, preferably in amounts of from 0.2 to 4% by weight based on the ammonium nitrate. The method is particularly advantageous for granular mixed fertilizers using a slurry process including heat drying.

BACKGROUND

Mixed fertilizers can be prepared by dry blending the powdered fertilizer ingredients, or by a slurry process where a granular form is desired. Such processes are well known. See, for example, Vincent Sauchelli, The Chemistry and Technology of Fertilizers (1st ed., Reinhold.) Such mixed fertilizers ordinarily include a phosphorus source, such as ordinary superphosphate, triple superphosphate, diammonium phosphate, phosphoric acid, etc. Frequently, a potassium source is included, particularly muriate of potash. In granular fertilizers, ammonium sulfate is used to minimize plasticity and prevent overgranulation. Ammonium sulfate, however, provides a relatively low nitrogen analysis, as compared with other compounds such as ammonium nitrate. While ammonium nitrate has been used to some extent in mixed fertilizers, processing and storage conditions, particularly those involving an elevated temperature, have tended to make it a less desirable ingredient of mixed fertilizers than it would otherwise be.

In the preparaiton of granular mixed fertilizers by slurry processes, the mixture after or during granulation is usually subjected to heat drying to remove moisture and to improve the granular form. Typical drying temperatures may range from 150 to 300° F. The reference here is to average product temperatures, and it will be understood that the drying air will be at temperatures considerably above the product temperatures, and that therefore portions of the granular material may be temporarily heated to even higher temperatures. Consequently, a heat sensitive material like ammonium nitrate is subjected to temperature conditions at which substantial losses of the ammonium nitrate can occur through decomposition.

It is known that ammonium nitrate when heated initially decomposes at a rate directly proportional to the temperature. This initial decomposition has been referred to as the "induction period," since if heating is continued, the induction period is followed by an accelerated decomposition. It has heretofore been reported that halide salts may accelerate the decomposition of ammonium nitrate after the induction period. Guiochon, G., Ann. Chim., (Paris) [13], 5, 295 (1960). This publication reported that the rate of decomposition in the induction period in the presence of halide salts is approximately equal to that of the pure ammonium nitrate at the same temperature, although the time for the transition from the induction period to the accelerated decomposition was influenced by the particular halide salt. In the processing of mixed fertilizers containing ammonium nitrate, we are not concerned with accelerated decomposition, but only with the decomposition which occurs in the so-called induction period, because of the relatively low temperatures and short times used for drying the mixed fertilizers. For example, with drying times of from one to four hours, typically one to two hours, and drying temperatures of from 150 to 300° F., typically 160 to 285° F., the decomposition is well within the so-called induction period and the problem of accelerated decomposition is not encountered. Similarly, under storage conditions, where the mixed fertilizer may encounter temperatures above 100° F. for a matter of hours, or even days, accelerated decomposition does not ordinarily occur. The problem therefore is how to inhibit or at least minimize the total cumulative loss of ammonium nitrate by decomposition under ordinary processing and storage conditions.

SUMMARY

This invention is based in part on the discovery that certain halide salts even when used in very low concentrations can appreciably inhibit the decomposition of ammonium nitrate when incorporated in mixed fertilizers. In general, iodide and bromide salts are preferred, and particularly the ammonium, alkali metal, and alkaline earth iodide or bromide salts. For the purpose of the present invention, the inhibitory salt can be used in amounts of substantially less than 5% by weight based on the ammonium nitrate. The preferred and optimum ranges will subsequently be discussed in detail, as well as the particular iodide or bromide salts, which are most desirable for reasons of economy and effectiveness.

This invention may be used with any of the standard procedures for preparing mixed fertilizers where ammonium nitrate is used as one of the ingredients. The method is particularly useful where ammonium nitrate is a principal component of the fertilizer, and where the mixed fertilizer is prepared in granular form from a slurry and involving a heat drying step. However, the method can also be used for stabilizing ammonium nitrate in dry blended mixed fertilizers.

DETAILED DESCRIPTION

In practicing the present invention, it is advantageous to employ an ammonium, sodium, potassium, or calcium iodide or bromide. From the standpoint of effectiveness in relation to cost, the iodide salts are preferable to the bromides, and ammonium or sodium iodide are particularly desirable. However, within the broad scope of the present invention, other ammonium, alkali metal, or alkaline earth metal bromides or iodides can be used.

Although the bromide and iodide salts vary in molecular weight, for the purpose of the present invention they can be used on the basis of the weight relation of the the salt to the ammonium nitrate. For example, the inhibitory salt can be used in an amount within the range from 0.2 to 4% by weight based on the ammonium nitrate. From the standpoint of cost and effectiveness, optimum results have been achieved within the range from 0.5 to 3% by weight. Since the inhibitory effect is believed to be due to the iodide or bromide ion, more accurate comparisons can be made on an equal mole or weight basis in terms of the iodide or bromide content of the salt. Excellent results have been achieved at a level of about 1% by weight of ammonium iodide, a preferred salt, based on the ammonium nitrate. Corresponding levels of other iodide or bromide salts will provide the same quantity of the iodide or bromide ion. In general, however, the ranges set out above can be used as a satisfactory guide for practicing the present invention.

Since procedures for preparing mixed fertilizers are well known in the art, it will not be necessary to describe them in detail herein. As previously indicated, however, this invention is particularly adapted for use with slurry processes for preparing granular mixed fertilizers. The same processing steps as previously used can be employed except that a substantial proportion of ammonium nitrate is used in admixture with the phosphorus and potassium providing fertilizer ingredients. The ammonium nitrate and other fertilizer ingredients will be admixed in a water slurry and at the same time the inhibitory bromide or iodide salt will be incorporated therein. The salt will therefore be present in an inhibitory concentration during the granulation and heat drying of the mixture. The drying temperatures can be the same as those previously employed, as described previously, but if needed, even higher temperatures can be used than those which had heretofore been conventional because of the inhibitory effect of the bromide or iodide salt. Similarly, drying times can be the same as those previously employed, but if necessary the drying period can be extended because of the presence of the inhibitory salt without undue loss of the ammonium nitrate by decomposition. For example, the mixed fertilizer may contain from 5 to 40% by weight on a dry solids basis of ammonium nitrate in admixture with standard fertilizer ingredients, such as regular or triple superphosphate and muriate of potash (potassium chloride). When employing the preferred concentrations of the inhibitory salt, as set out above, such mixtures can be subjected to heat drying at temperatures of 150 to 300° F. for periods of one-half to five hours with substantially reduced losses of ammonium nitrate as compared with the same mixtures without the inhibitory salts.

In an accelerated weight loss test, pure ammonium nitrate (AN) was compared with ammonium nitrate containing 2% by weight of ammonium iodide, which had been intimately mixed by dry blending with the ammonium nitrate. The heating was at 225° C. The cumulative percentage weight losses of ammonium nitrate at one-half, one, two and four hours are summarized below in Table A.

TABLE A

| | Cumulative percentage weight loss | |
|---|---|---|
| | Pure AN | 2% w. NH$_4$I |
| Time of heating, hr.: | | |
| 0.5 | 1.0 | 0.2 |
| 1.0 | 1.9 | 0.8 |
| 2.0 | 8.5 | 1.5 |
| 4.0 | 26.0 | 2.3 |

In a similar test, ammonium nitrate containing 2% by weight ammonium iodide was compared with ammonium nitrate containing calcium iodide on an approximately equal weight basis. Since the calcium iodide was incorporated in the hydrated form, it was necessary to use slightly more of the calcium iodide hydrate. The accelerated test temperature again was 225° C. The comparative data is set out below in Table B.

TABLE B

| | Cumulative percentage weight loss | |
|---|---|---|
| | 2% w. NH$_4$I | 2.4% CaI$_2$. 3H$_2$O [1] |
| Time of heating, hr.: | | |
| 0.5 | 0.21 | 0.03 |
| 1.0 | 0.41 | 0.51 |
| 2.0 | 0.65 | 0.66 |
| 4.0 | 1.21 | 1.38 |

[1] Equivalent to 2.03% by weight CaI$_2$.

In conducting the tests summarized above in Tables A and B, a small air-cooled condenser was attached to the top of the flasks in which the mixtures were heated, thereby trapping any moisture or iodine liberated, and returning them to the flasks by refluxing. Since under ordinary drying conditions for mixed fertilizers, the moisture is being removed and there may be some loss of the iodide or bromide by decomposition, it may be desirable to increase the amount of the inhibitory salt incorporated to be sure that a sufficient concentration of the salt is present during the entire drying period. For example, after heating a mixture of ammonium nitrate and 2% ammonium iodide for over two hours at 225° C., while permitting moisture and iodine to escape as liberated, the data indicates that the concentration of iodide ion in the mix is substantially reduced. Using the same procedure as that for the data in Tables A and B, except that there was no condenser employed, the data set out in Table C was obtained.

TABLE C

| | Cumulative percentage weight loss | |
|---|---|---|
| | Pure AN | 2% w. HN$_4$I |
| Time of heating, hr.: | | |
| 0.5 | 2.0 | 0.3 |
| 1.0 | 4.0 | 0.7 |
| 2.0 | 8.3 | 2.0 |
| 4.0 | 18.3 | 5.0 |

In tests similar to those just described, ammonium bromide and potassium bromide were found to inhibit the decomposition of ammonium nitrate. The data indicates that on a mole basis, the bromide ion is slightly less effective as an inhibitor than the iodide ion, but in general the same concentrations of bromide salts are usable as the iodide salts. This invention is further illustrated by the following specific examples.

EXAMPLE I

A simulated 12–12–12 mixed fertilizer was prepared from ammonium nitrate, triple superphosphate, saltpeter and sea sand. The composition of the ingredients were dry blended to form a mixture containing 24.1% ammonium nitrate, 26.7% triple superphosphate, 25.7% saltpeter, and 23.5% sea sand. Samples of this mixture were heated at 210° C. Some of these samples contained ammonium iodide in a concentration of ½% on the ammonium nitrate. Up to about four hours of heating, the cumulative losses of the samples containing ammonium iodide were substantialy less.

EXAMPLE II

In further illustration of the present invention, dry blended mix fertilizers can be produced as summarized below for Formulations 1, 2 and 3.

Formulation 1

Ingredients: Parts by weight
Ammonium nitrate _____ 900
Ammonium iodide _____ 10
Triple superphosphate _____ 400

Formulation 2

Ingredients: Parts by weight
Ammonium nitrate _____ 800
Sodium iodide _____ 16
Triple superphosphate _____ 450
Muriate of potash _____ 300

Formulation 3

Ingredients: Parts by weight
Ammonium nitrate _____ 1200
Potassium bromide _____ 30
Muriate of potash _____ 700

EXAMPLE III

A granular mixed fertilizer can be prepared by using the ingredients set out below in Formulation 4.

Formulation 4

| Ingredients: | Parts by weight |
|---|---|
| Nitrogen solution[1] | 50 |
| Anhydrous ammonia | 119 |
| Ammonium sulfate | 93 |
| Ammonium nitrate | 500 |
| Ammonium iodide | 10 |
| Ordinary superphosphate | 149 |
| Triple superphosphate | 457 |
| Muriate of potash | 400 |
| Sulphuric acid (100% basis) | 260 |

[1] Solution containing 41% nitrogen, 22% ammonia.

The ammoniation and mixing can be carried out in a slurry phase similar to that used in the Martenet process. See Martenet, S. J., Agr. Chemicals, 9, No. 4, 46–8, 138–41 (1954). A sufficient amount of water is added so that a slurry is formed at the temperatures developed by the ammoniation reaction, and solidification and granulation of the mass occurs as it is cooled. The granular wet product from the mixing step can contain from 12 to 18% moisture, and may be passed to a rotary dryer, such as a Roto-Louvre dryer. At the feed end of the dryer the product temperature can be about 150° F. with the temperature rising to about 300° F. at the discharge end of the dryer. The residence time in the dryer will be about one hour.

In the foregoing procedure, ammonium bromide, sodium iodide, sodium bromide, potassium iodide, potassium broide, calcium iodide, or calcium bromide can be substituted for the ammonium iodide on an equivalent weight or iodide-bromide ion basis.

While this invention is particularly applicable to the processing of mixed fertilizers, certain of the teachings of the foregoing specification are applicable to the heat drying of ammonium nitrate to reduce its moisture content. Freshly manufactured ammonium nitrate may contain as much as 5% or more water, and it is desirable to reduce the moisture content to below 1% prior to bagging and shipment. While relatively low temperatures are employed, such as temperatures of 100 to 140° C., losses of ammonium nitrate can occur by decomposition. This decomposition can be substantially reduced by incorporating in the ammonium nitrate prior to heat drying a bromide or iodide salt of the kind and in the proportions set out above. For example, fertilizer grade ammonium nitrate containing about 4% water by weight, can be thoroughly intermixed with 1 to 2% by weight based on the ammonium nitrate of ammonium iodide, or other iodide or bromide salt, as set out above with respect to mixed fertilizers, and the resulting mixture passed through a rotary dryer with a product temperature at feed end of about 105° C. to a product temperature at the discharge end of about 125° C. The mixture will be maintained in the dryer for about one-half hour to one hour, as required, to reduce the moisture content to about 0.25% by weight. The product is then ready for bagging and distribution, and the bromide or iodide salt therein will be of value in preventing decomposition of the ammonium nitrate during shipping and storage.

While in the foregoing specification this invention has been described in relation to certain preferred embodiments thereof, and many details have been set forth for the purpose of illustration, it will be apparent that this invention is susceptible to additional embodiments and that certain of the details described herein can be varied considerably without departing from the basic principles of the invention.

We claim:

1. In the manufacture and storage of an ammonium nitrate fertilizer product in a dry particulate form, said product being selected from the class consisting of ammonium nitrate and ammonium nitrate-containing mixed fertilizers wherein said product is subjected to a temperature above 100° F. up to 300° F. for a sufficient length of time to cause appreciable decomposition of the ammonium nitrate of said product within its induction period and without accelerated decomposition thereof, the method of inhibiting said decomposition comprising mixing with said fertilizer produce from 0.2 to 4% by weight based on the ammonium nitrate content of said product of an iodide or bromide salt selected from the class consisting of the ammonium, alkali metal, and alkaline metal salts thereof, said iodide or bromide salt being in intimate association with the ammonium nitrate of said product.

2. The method of claim 1 in which said salt is mixed with said product in an amount of from 0.5 to 3% by weight based on the ammonium nitrate content thereof.

3. The method of claim 1 in which said salt is selected from the class consisting of the ammonium, sodium, potassium, and calcium iodides.

4. In the manufacture of granular mixed fertilizers containing ammonium nitrate in admixture with phosphorus and potassium providing fertilizer ingredients wherein said admixture is formed in a water slurry and the slurry is subjected to heat drying and granulation at a temperature of from 150° to 300° F., said heat drying being continued at said temperature for a sufficient length of time to cause appreciable decomposition of the ammonium nitrate within its induction period and without accelerated decomposition thereof, the method of inhibiting the decomposition of the ammonium nitrate during said heat drying comprising incorporating in said slurry admixture from 0.2 to 4% by weight based on the ammonium nitrate content thereof of an iodide or bromide salt selected from the class consisting of the ammonium, alkali metal, and alkaline earth metal salts thereof.

5. The method of claim 4 in which said salt is incorporated in an amount of from 0.5 to 3% by weight based on the ammonuim nitrate of said slurry.

6. The method of claim 4 in which said salt is selected from the class consisting of the ammonium, sodium, potassium, and calcium iodides.

7. The method of claim 5 in which said salt is ammonium iodide.

8. In the heat drying of ammonium nitrate wherein the ammonium nitrate is heated at a temperature of from 100 to 140° C. for a sufficient length of time to cause appreciable decomposition of the ammonium nitrate within its induction period and without accelerated decomposition thereof, the method of inhibiting the decomposition of the ammonium nitrate comprising mixing therewith from 0.5 to 3% by weight based on the ammonium nitrate of an iodide or bromide salt selected from the class consisting of the ammonium, alkali metal, and alkaline earth metal salts thereof, said mixture containing in excess of 1% water by weight, and thereafter subjecting said salt-containing mixture to said heat drying to reduce the moisture content thereof to less than 1%.

9. The method of claim 8 in which said salt is selected from the class consisting of the ammonium, sodium, potassium and calcium iodides.

10. The method of claim 8 in which said salt is ammonium iodide.

References Cited

UNITED STATES PATENTS 3,366,468    1/1968    Parker _____ 71—35

REUBEN FRIEDMAN, Primary Examiner

R. BARNES, Assistant Examiner

U.S. Cl. X.R.

23—103; 71—60